United States Patent [19]

Dongelmans

[11] Patent Number: 5,143,528

[45] Date of Patent: Sep. 1, 1992

[54] LINT COLLECTOR

[75] Inventor: Anthony A. Dongelmans, Bryan, Ohio

[73] Assignee: Challenge Industries, Bryan, Ohio

[21] Appl. No.: 479,715

[22] Filed: Feb. 14, 1990

[51] Int. Cl.⁵ .............................................. B01D 46/04
[52] U.S. Cl. ...................................... 55/283; 55/302; 55/492; 55/294; 34/82
[58] Field of Search .................. 34/85, 82, 32; 55/294, 55/468, 290, 267, 269, 302, 283, 490, 492, 494

[56] References Cited

U.S. PATENT DOCUMENTS

| | | | |
|---|---|---|---|
| 1,034,597 | 8/1912 | Duryea | 55/492 X |
| 1,127,242 | 2/1915 | Hay | 55/302 |
| 2,746,561 | 5/1956 | Beber et al. | 55/302 X |
| 3,016,984 | 1/1962 | Getzin | 55/492 |
| 3,423,906 | 1/1969 | Fried | 34/82 |
| 3,890,290 | 6/1975 | McCabe | 55/302 X |
| 4,810,270 | 3/1989 | Terry et al. | 55/302 X |
| 4,826,512 | 5/1989 | Fuller | 55/302 X |

*Primary Examiner*—Henry A. Bennet
*Attorney, Agent, or Firm*—Renner, Otto, Boisselle & Sklar

[57] ABSTRACT

An apparatus for collecting lint from a gas comprising a shell, a gas passageway through the shell, and a lint-collecting component positioned to collect lint from the gas. The lint-collecting component has a vertical longitudinal axis and a collecting surface, preferably cylindrical, surrounding the longitudinal axis. The apparatus also includes a cage which causes the lint to accumulate in a plurality of sections on the collecting surface. The shell has a smooth interior surface to allow the lint to travel over the surface without hang-up. A blow-off system is provided to remove accumulated lint from the collecting surface. The blow-off system includes an air reservoir and a regulator/filter for filling the reservoir with air from a supply line at a controlled rate. A control system activates the blow-off system and includes a timed delay to allow the effects of coasting to minimize.

39 Claims, 12 Drawing Sheets

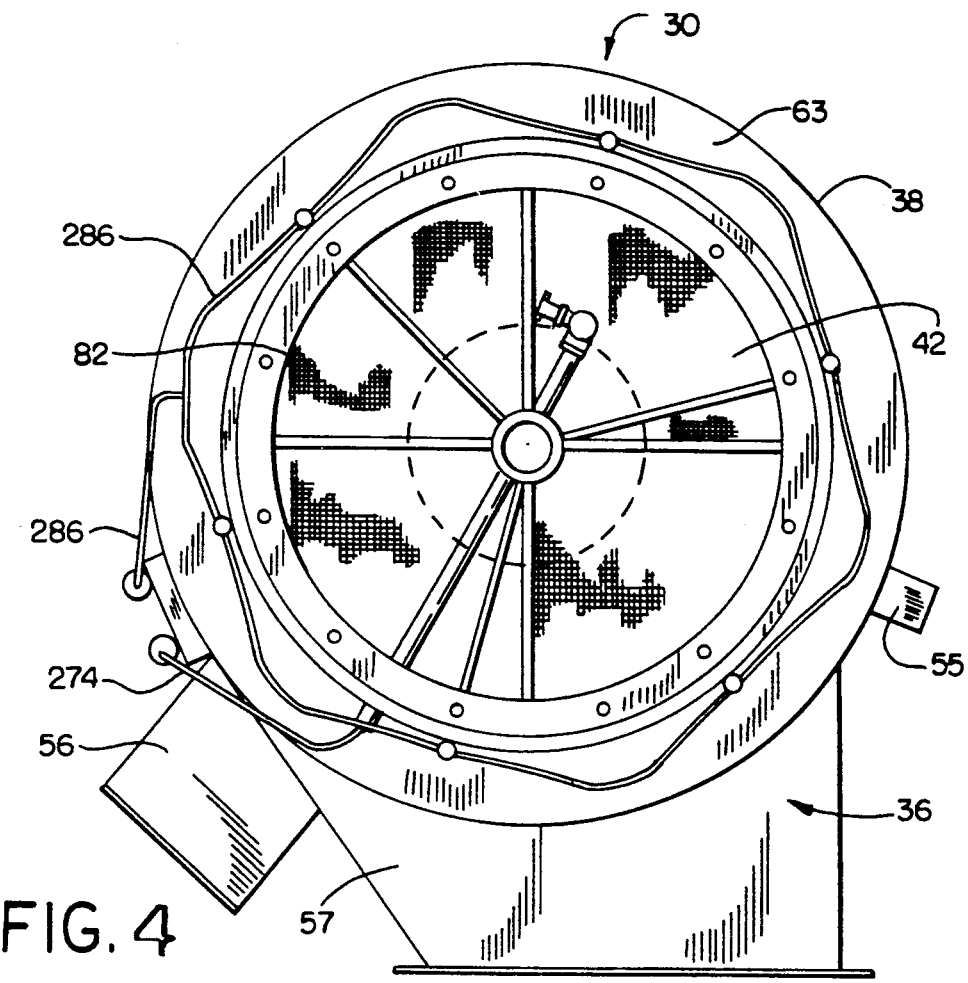
FIG. 4
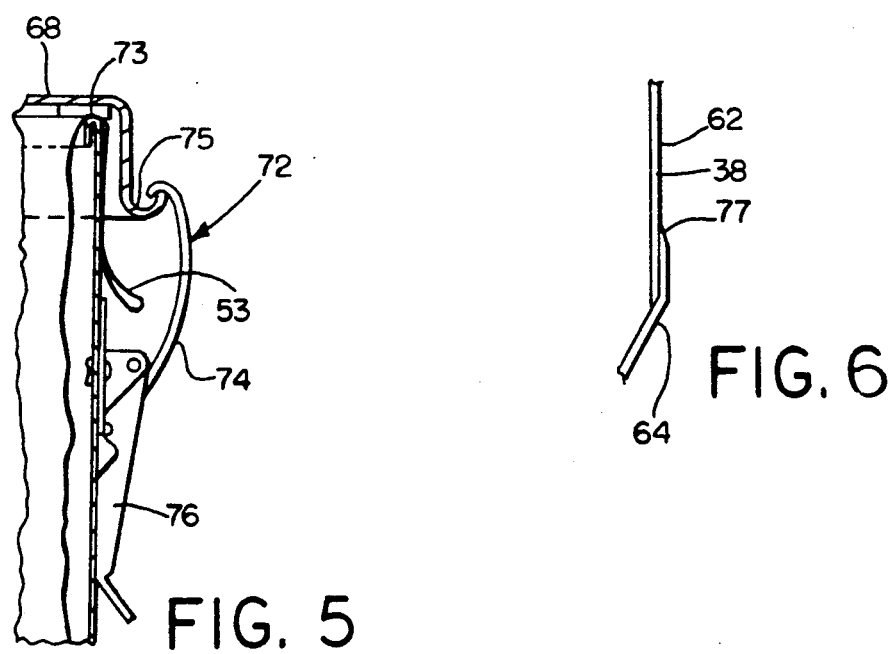
FIG. 5
FIG. 6

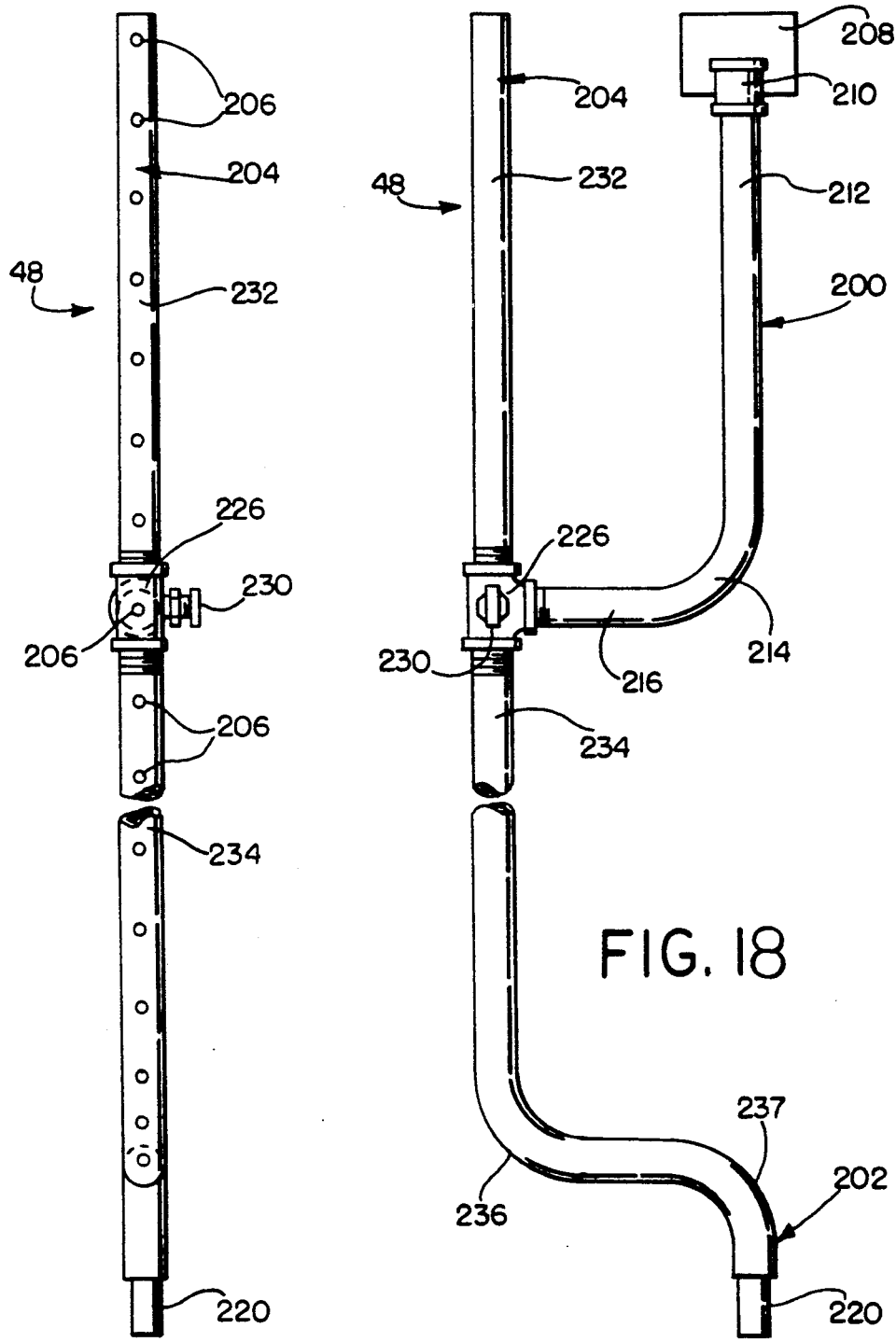
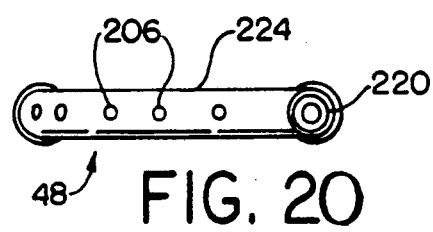
FIG. 19  FIG. 18  FIG. 20

LINT COLLECTOR

FIELD OF THE INVENTION

The invention herein disclosed relates generally to an apparatus for removing particles from a flow of gas and more particularly to a lint collector for removing lint from the exhaust gas of a dryer.

BACKGROUND OF THE INVENTION

A lint collector is commonly used in conjunction with a dryer to remove lint from the dryer exhaust gas. A lint collector typically includes an outer shell, or body which provides a passageway for the exhaust gas. The outer shell will often be made of several portions welded together resulting in sharp weld seams on the inside of the shell. These seams may create rough edges resulting in lint hang-up within the shell during a lint removal process.

A lint collector will also typically include a lint collecting component which actually collects the lint from the exhaust gas as it passes through the outer shell. The lint collecting component is usually a flat, or substantially planar filter and is usually made of a fabric, such as a nylon mesh, tightened about a frame. Because of its planar shape, the gas flows through the component in a two-dimensional fashion i.e. all flow paths are substantially parallel. Thus, the lint collecting needs of larger dryers must be accommodated with a large and bulky lint collector which uses up valuable space. Further, the nylon mesh components are easily punctured by foreign objects, such as nuts, bolts, and/or coins which may find their way into a lint collector.

Most lint collectors have some sort of a lint removal process which periodically removes accumulated lint from the lint collecting component. A solid sheet or "blanket" of lint will normally develop on the lint collecting component and the lint removal process must remove this entire blanket. In larger lint collectors especially, this may put significant demands on the lint removal process.

The lint removal process may include a blow-off device which blows air through the lint collecting component in a direction which forces the lint off the component. When a blow-off device is used, a large volume of air is usually necessary. Often in the building or room in which a dryer is located, a supply line of compressed air is available. However, if a lint removal device were directly connected to such air supply line for blowing lint off the lint collecting component, then air pressure in such air supply line may be undesirably depleted.

The lint removal process must also be activated at the appropriate times. While an automatic actuation of the lint removal process when a dryer cycle is complete is convenient, it is not without drawbacks. A dryer equipped with a large exhaust blower may experience a condition called "coasting" "Coasting" results from an exhaust blower continuing to turn even after the dryer is shut off. Consequently, the exhaust blower continues to create a flow in the opposite direction of the flow produced by the lint removal system. Thus, while the dryer is coasting, these two flows are fighting against each other, and the lint removal process is inefficient and sometimes substantially unsuccessful.

For these and other reasons, a need remains for an improved lint collector.

SUMMARY OF THE INVENTION

A lint collector according to the present invention provides many advantages over prior art lint collectors. For example, the lint collector has an outer shell with a smooth interior to minimize lint hang-up within the shell during a lint removal process. Additionally, the lint collector has a lint collecting surface which allows three-dimensional gas flow, resulting in a significant reduction in the size of the lint collector. Another advantage associated with the lint collecting surface is its vertical orientation which aids in the lint removal process. Further, the lint collector has a cage which causes lint to accumulate into a plurality of sections on the lint collecting surface, such as small squares, facilitating the removal of lint. Still further, a blow-off system is provided in which a blow-off gas is supplied in manner minimizing the depletion of pressure in an existing gas supply line. Yet another advantage of the present invention is a control system which automatically activates the blow-off system while compensating for the effects of coasting.

More particularly, according to one aspect of the invention, an apparatus for collecting lint from a gas, or a lint collector, is provided. The lint collector comprises a shell, a gas passageway through the shell, and a lint-collecting component positioned to collect lint from such gas. The lint-collecting component has a longitudinal axis and includes a lint-collecting surface substantially surrounding the longitudinal axis.

According to another aspect of the invention, such longitudinal axis is positioned in a relatively vertical direction.

According to another aspect of the invention, such axis is generally upstanding or extending in a generally vertical direction.

According to another aspect of the invention, the lint collector includes a cage for causing the lint to accumulate in a plurality of sections on the lint collecting surface to facilitate the removal of lint.

According to another aspect of the invention, the interior surface of the shell is smooth to allow the lint travel over the surface without hang-up.

According to another aspect of the invention, a blow-off system includes a device for filling a gas reservoir at controlled slow rate.

According to another aspect of the invention, a control system for stopping and starting the blow-off system includes a delay mechanism for delaying activation of the blow-off system for a set period of time after the dryer is turned off.

To the accomplishment of the foregoing and related ends, the invention, then, comprises the features hereinafter fully described and particularly pointed out in the claims, the following descriptions and annexed drawings setting forth in detail a certain illustrative embodiment of the invention, this being indicative, however, of one of the various ways in which the principles of the invention may be employed.

BRIEF DESCRIPTION OF THE DRAWING

In the annexed drawings:

FIG. 4 is a top view of the lint collector looking down through the lint collector outlet;

FIG. 5 is an enlarged view, partly broken away, of one of the clamps used to secure a lint collecting drum to the lint collector;

FIG. 6 is a sectional view, partly broken away, of the connection between portions of the outer shell showing a smooth transition;

FIG. 18 is a front view of the lint blow-off spray manifold;

FIG. 19 is a side view of the spray manifold;

FIG. 20 is a bottom view of the spray manifold;

DETAILED DESCRIPTION

Figure 1:
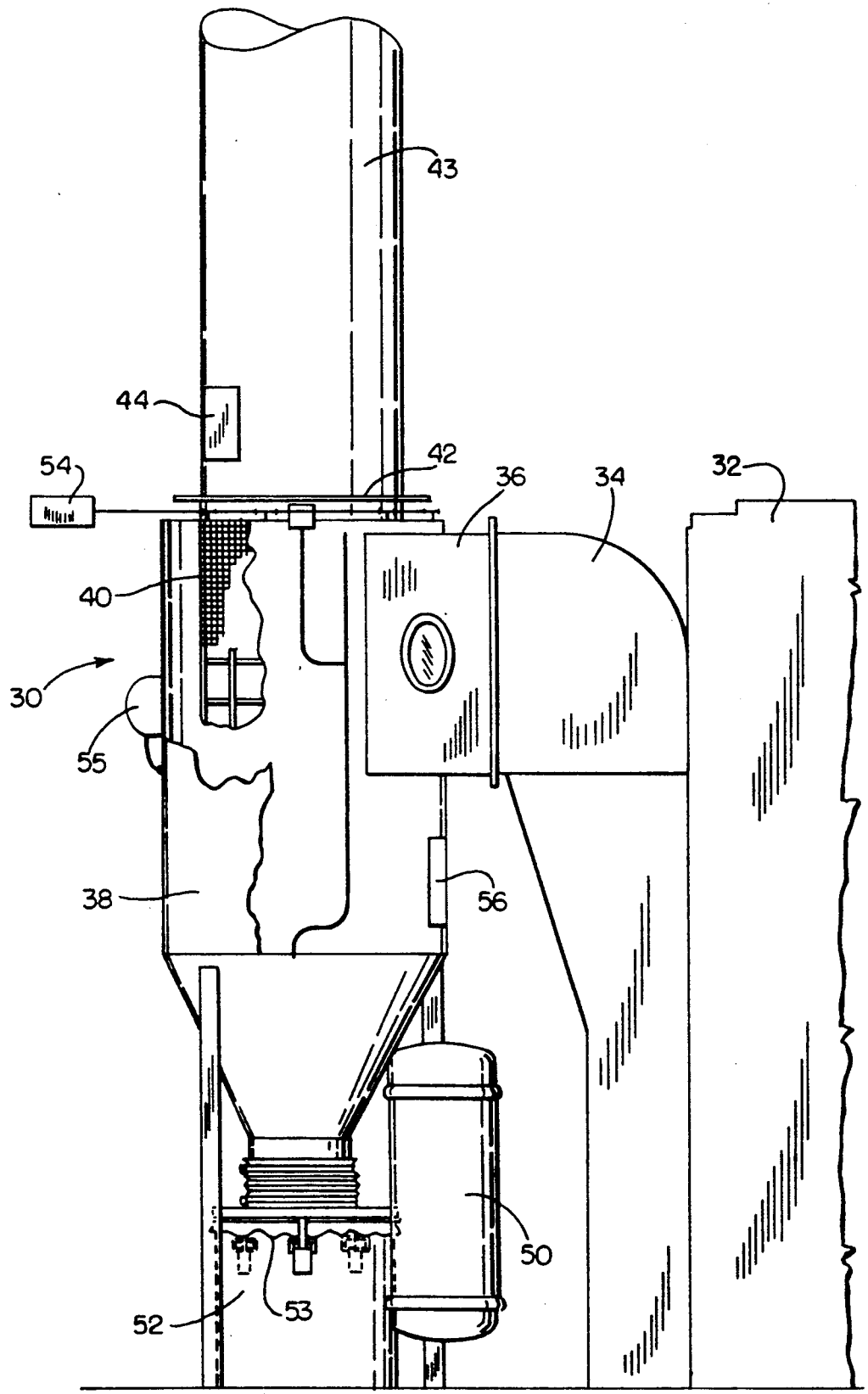
FIG. 1 is a schematic front view of a lint collector according to the present invention installed on a dryer, various components of the lint collector being schematically shown such as an outer shell, an internal screen assembly, a lint blow-off system which includes a spray manifold and an air reservoir, a sprinkling system, an overload indication system and a control system.

Referring now to the drawings in detail and initially to FIG. 1, a lint collector 30 according to the present invention is shown installed on a dryer 32. The following detailed description relates to a commercial lint collector which may be used with a large industrial dryer such as a hotel dryer for the facilities' sheets and towels, or a factory dryer for workers' clothes. Specifically, the preferred embodiment relates to a 8000 CFM (cubic feet per minute) rated lint collector for installation on a Challenge ® Pacesetter ™ Tumbler-Dryer. However, the present invention is not limited to such applications and may accommodate almost all sizes of dryers. Additionally, the present invention may be used in other settings to remove particles from a flow of gas.

The operation of the lint collector 30 may be briefly outlined by referring to FIG. 1, which shows schematically some of the components of the lint collector 30, along with other associated apparatus. While the dryer 32 is in use, a gas, namely exhaust air and lint, exits the dryer 32 through a connection duct 34 which is connected to a lint collector inlet 36. The inlet 36 is located on an upper circumferential side of the lint collector 30 thereby allowing side-by-side compatibility with the dryer 32.

The exhaust gas from the dryer 32 flows through the inlet 36 and enters an outer gas impervious shell or body 38 of the lint collector 30 which provides a passageway for the gas through the lint collector itself. As the gas flows through this passageway, lint is deposited on an internal screen assembly 40. The gas, now exhaust air with lint removed, exits the lint collector 30 through a lint collector outlet, or top opening 42. The outlet 42 is substantially circular in section and has a diameter of accommodatel. Accommodatel is approximately equal to twenty-four inches in the preferred embodiment. An exhaust duct 43, also having a diameter accommodatel, is connected at one end to the outlet 42. While in the drawing the duct 43 is dimensioned to match the outlet 42, transition sections (not shown) may be used to accommodate ducts of different sizes. The exhaust duct 43 includes an access opening 44 for periodic maintenance of internal parts of the lint collector 30. The opening 44 should be large enough to allow convenient access to the internal parts, e.g., having a six inch minimum diameter or side.

An opposite end of the exhaust duct 43 communicates with an external environment preferably outside of the building housing the dryer 32 and the lint collector 30. For example, the exhaust duct 43 may be conveniently run to the roof of the building. The exhaust duct 43 may be supported independently of the lint collector 30, e.g., by structural members (not shown) attached to the building ceiling. In such case the lint collector 30 may be disconnected from the exhaust duct 43 and separately moved for maintenance.

Figure 21:
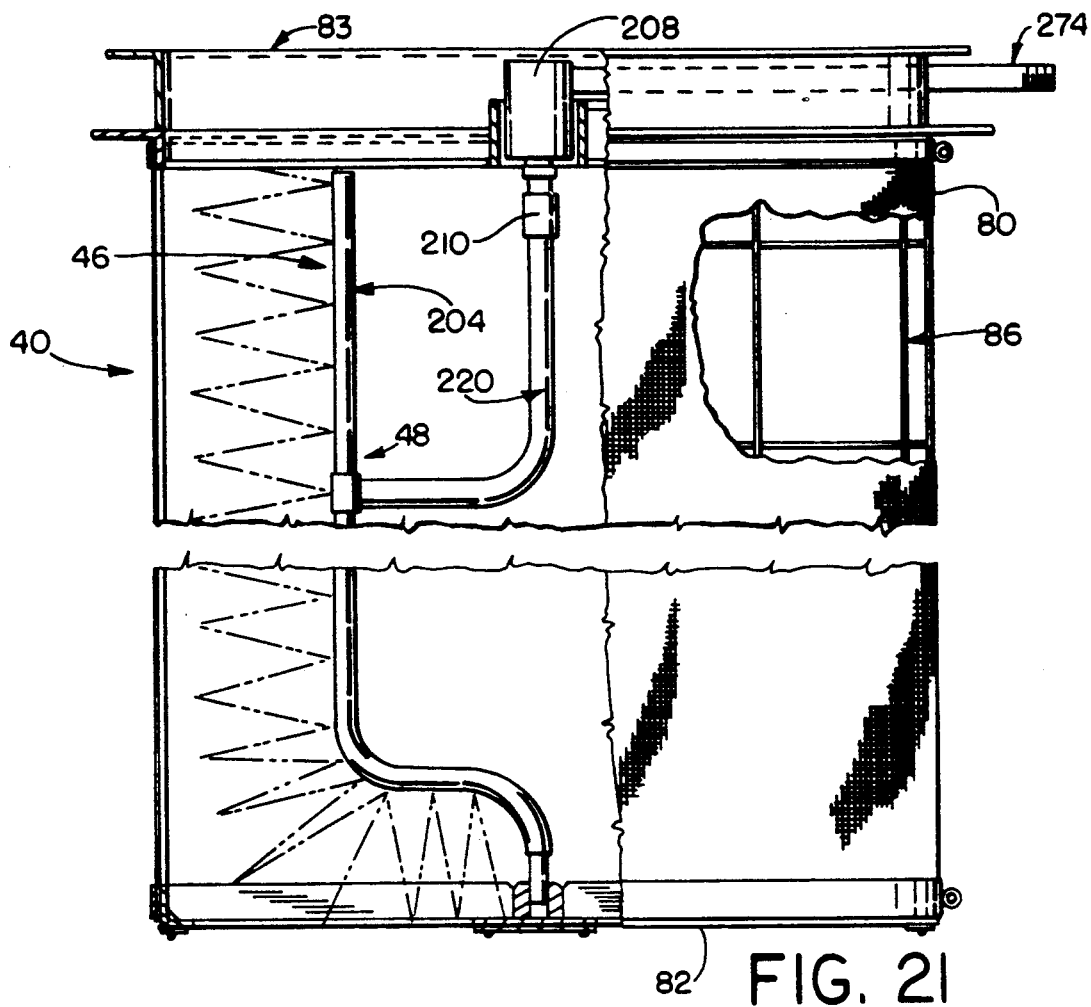
FIG. 21 is a front view, partly broken away, of the screen assembly and the spray manifold showing the flow of air during the lint blow-off process.
Figure 22:
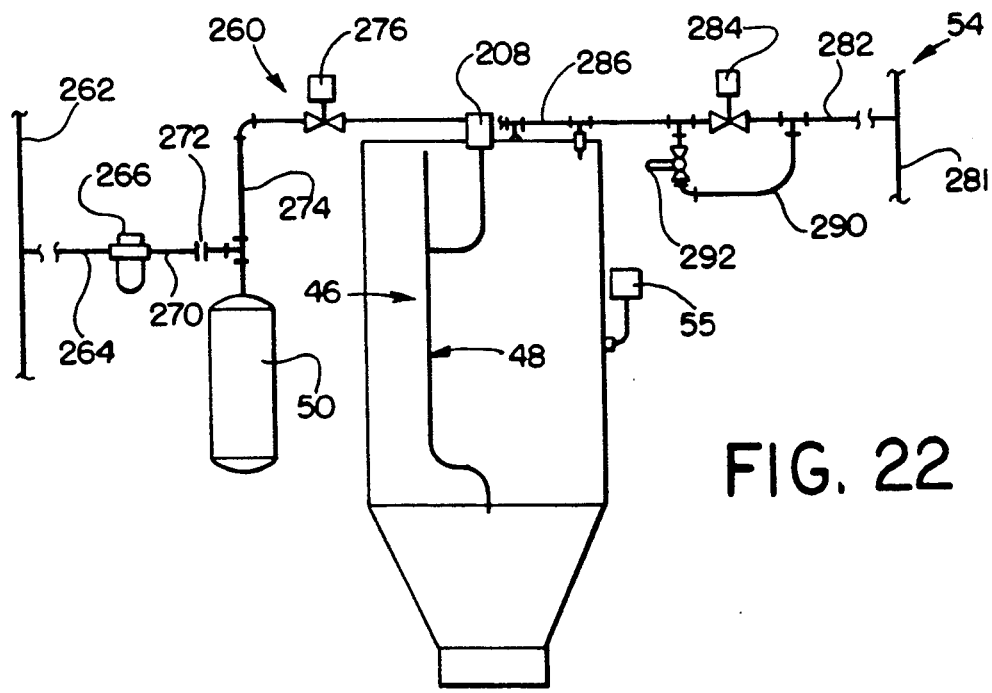
FIG. 22 is a schematic view of the blow-off system and the sprinkling system.

After the dryer 32 completes a drying cycle, the accumulated lint may be removed from the screen assembly 40 by a lint blow-off system 46 (FIGS. 21 and 22). The blow-off system 46 includes a spray manifold 48 (FIGS. 18–20) and an air reservoir 50. The spray manifold 48 sprays air supplied from the air reservoir 50 through the screen assembly 40 forcing the lint off of the assembly. The lint then drops downwardly and is deposited in a large reusable metal lint storage drum 52. A plastic liner, or bag 53, may be placed inside this lint collector drum to facilitate removal and disposal of collected lint.

The lint collector 30 also includes safety features such as a water sprinkler system 54 for preventing and/or extinguishing fire and an overload indicator system 55 for indicating an overload of the lint collector. The lint blow-off system 46, the water sprinkler system 54, and the overload indication system 55 are automatically activated by and/or affected by a control system 56.

Figure 2:
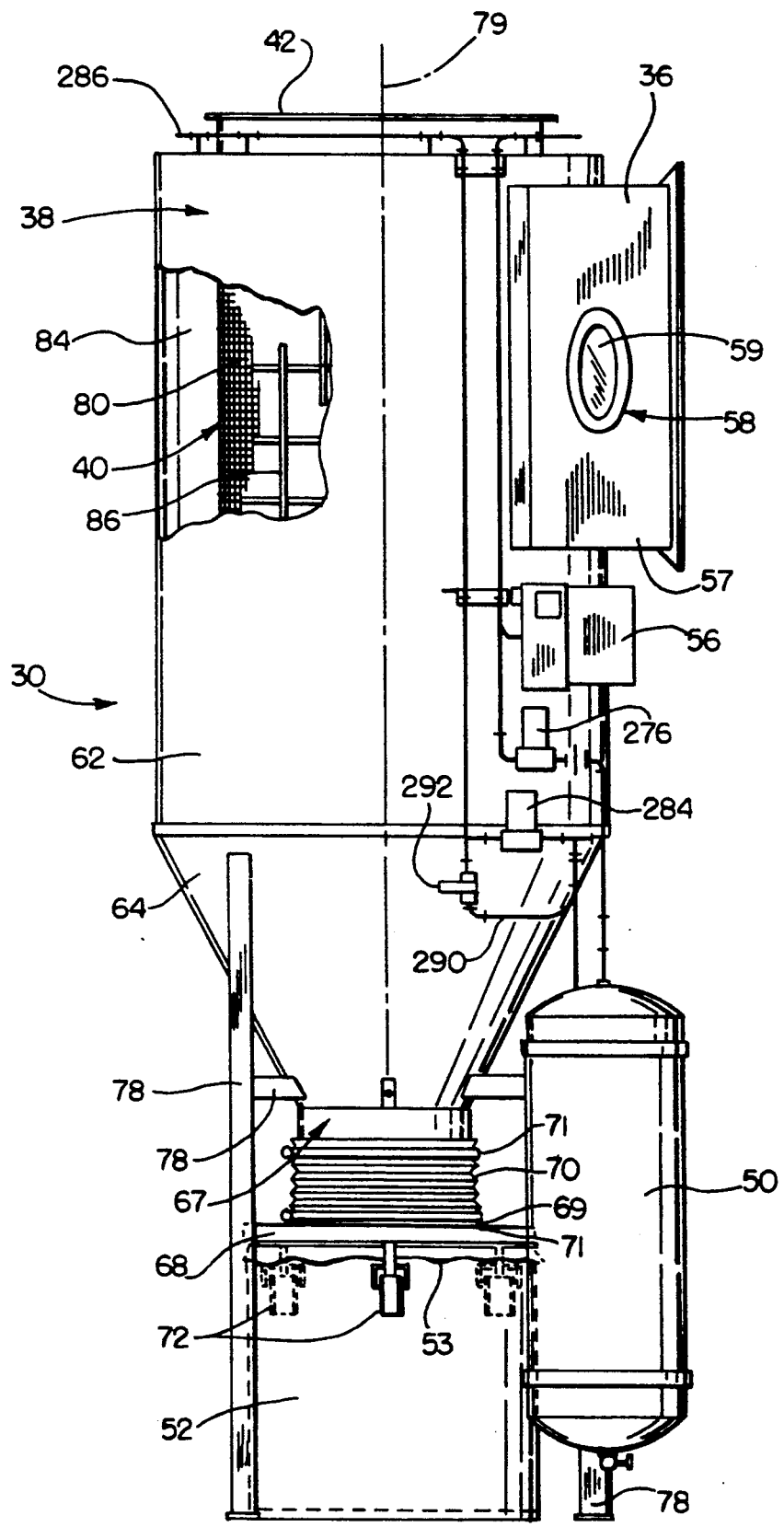
FIG. 2 is a detailed front view of the lint collector.
Figure 3:
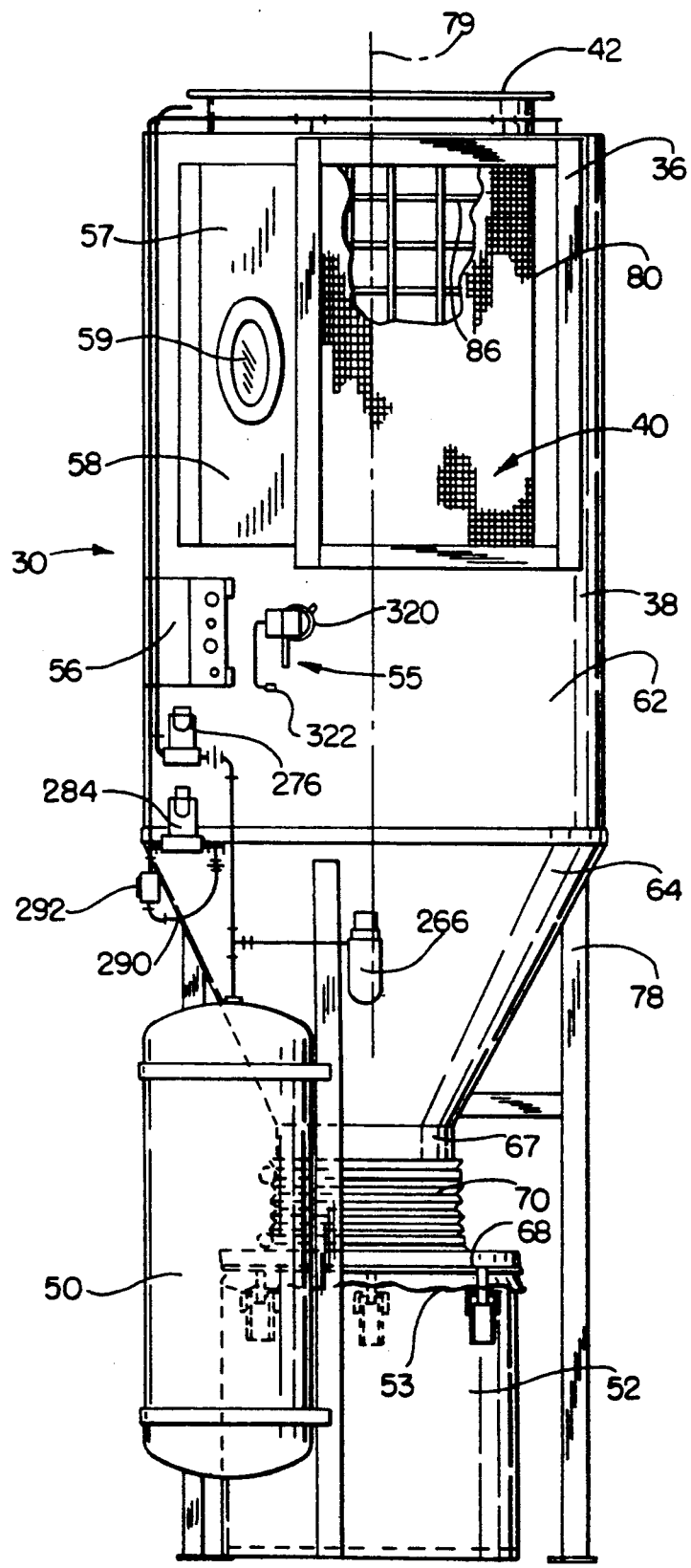
FIG. 3 is a side view of the lint collector.

The foregoing and other components of the lint collector 30 are shown in more detail in FIGS. 2–24. Referring to FIGS. 2–4, the lint collector 30 is illustrated separately from the associated dryer apparatus. The lint collector inlet 36, through which the exhaust gas enters the apparatus, is a roughly rectangular duct having a slanted wall 57 on one side which guides the exhaust gas into the outer shell 38. Located on this wall 57 is an access door 58 with an inspection window 59 permitting periodic inspections and maintenance to be performed conveniently.

The shell 38 includes an upper cylindrical portion 62, which has a top annular flange 63 (FIG. 4), and a lower conical portion 64. The shell 38 preferably is of stainless steel. The shell 38 provides the passageway through which the exhaust gas passes from the lint collector inlet 36 through the screen assembly 40 to the lint collector outlet 42. In the illustrated embodiment, the cylindrical portion 62 has a diameter, greater than the opening surrounded by the top flange 63. For a lint collector designed for installation on a Challenge ® Pacesetter ™ Tumbler-Dryer, the diameter of the upper cylindrical portion 62 would be approximately equal to thirty-four inches.

The lower conical portion 64 of the shell 38 has a wide top end approximately equal to that of the upper cylindrical portion 62. A lint discharge opening 66 (FIG. 4) is located at the opposite and narrow bottom end of the conical portion 64. The opening 66 should be large enough to allow lint easily to fall into the lint storage drum 52. An eighteen inch diameter circular opening is suitable for this purpose. The conical portion 64 has a bottom annular flange 67 along its lower open end providing a smooth straight surface.

The lint collector drum 52 is covered by a lid 68 which has an upwardly extending lip, or flange 69 surrounding an eighteen inch opening. A flex conduit 70 connects the opening 66 in the outer shell to the opening in the drum 52. One end of the conduit 70 is slipped over the flange 67 and secured by a band clamp 71, while the opposite end of the conduit is slipped over the flange 69 and secured by a second band clamp 71. The lid 68 is secured to the drum 52 by three over-the-center clamps 72.

Referring now additionally to FIG. 5, one of the clamps 72 is shown. When assembled for use, the plastic bag 53 extends over the top edge of the drum 52. A foam rubber, gasket 73 on the inner surface of the lid 68 prevents damage to the bag. An arm-portion 74 of the clamp 72 hooks with an annular lip 75 of the lid 68, bracing the lid against the drum 52. When the latch 76 of the clamp 72 is loose, a clearance of roughly an inch is present between the lid 68 and the drum 52. The lid 68 may easily be raised, compressing the flexible conduit 70, and the drum 52 slipped out to dispose of the collected lint.

Turning now to FIG. 6, the construction of the outer shell 38 is shown in some detail. The upper cylindrical portion 62 and the lower conical portion 64 are joined together in the following manner. The top edge of the conical portion 64 is folded over or bent to engage the bottom edge of the cylindrical portion 62, and the bottom edge of the cylindrical portion 62 is smoothed off. Welds 77 are made on the outside of the shell 38. The result is a smooth interior surface which minimizes lint hang up and allows the lint to fall smoothly down into the lint storage drum 52.

Turning briefly back to FIGS. 2 and 3, one may see that the outer shell 38 includes appropriate structural members 78 which hold the lint collector 30 in the desired orientation. In the illustrated embodiment, the orientation of the outer shell 38 is such that its longitudinal axis 79 is vertical. Additionally, the structural members 78 are selected so that the lint storage drum 52 is at ground level. This positioning allows a safe, convenient access to the lint storage drum 52 and eliminates the need for a worker to climb up a ladder or other device to empty the drum. However, the structural members 78 may be altered in any appropriate manner to accommodate different applications.

Figure 7:
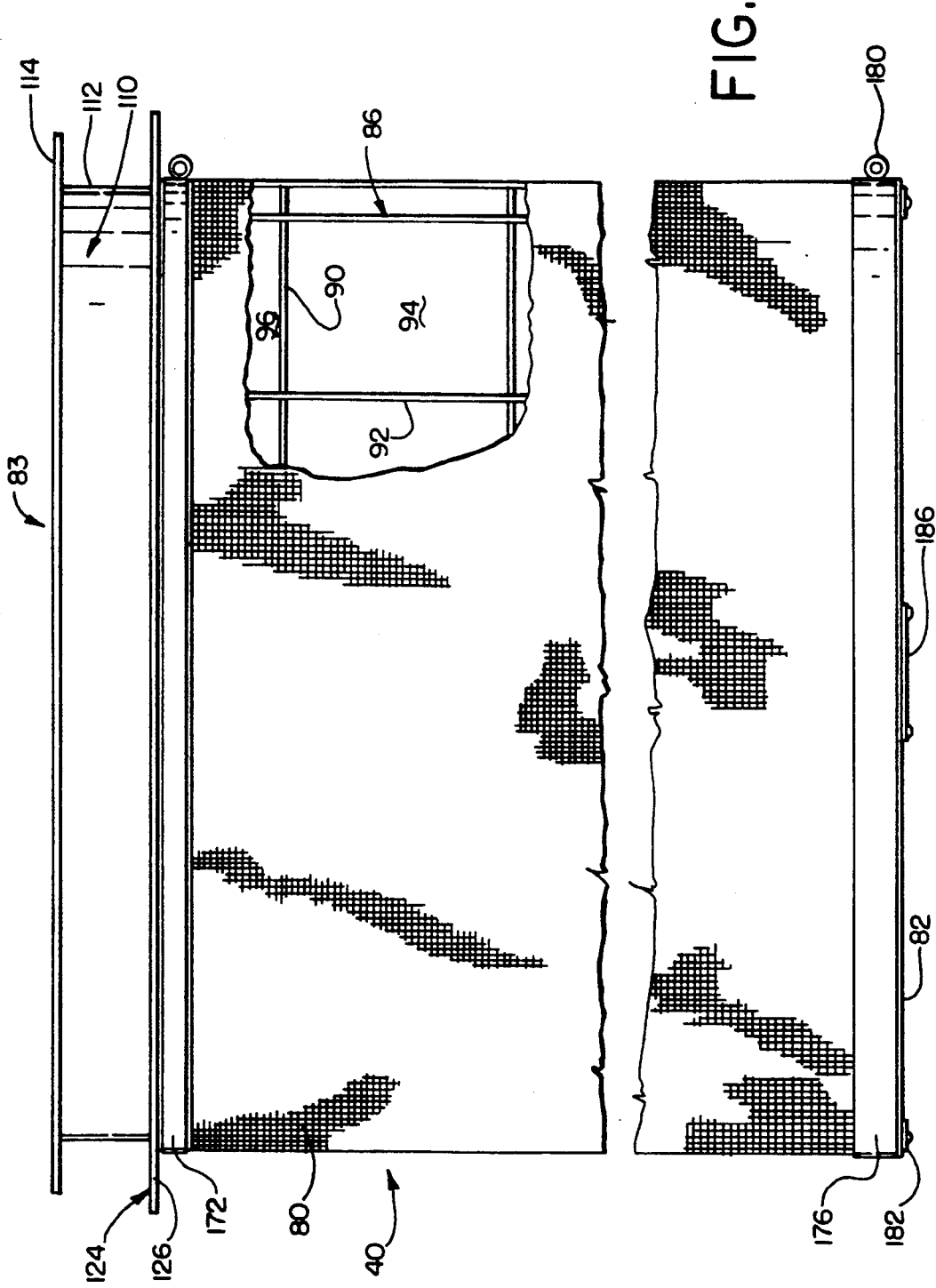
FIG. 7 is a front view of the screen assembly including screens mounted on a screen support.
Figure 8:
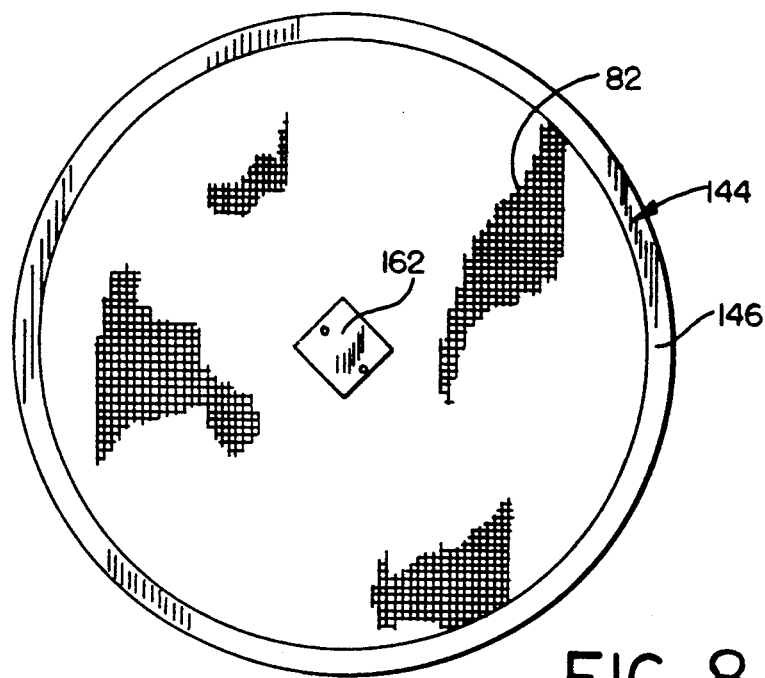
FIG. 8 is a bottom view of the screen assembly.

While the shell 38 provides the gas passageway, the actual "lint collecting" components of the lint collector 30 are contained in the screen assembly 40 which is shown separated from the rest of the lint collector 30 in FIGS. 7 and 8. The screen assembly 40 includes a cylindrical screen 80 and a bottom circular screen 82 which is substantially planar as shown for collecting lint from the exhaust gas. A screen support 83 provides a structural skeleton for the screen assembly 40 by holding screens 80 and 82 in the appropriate lint-collecting position. The screen support 83 is additionally designed to accommodate the blow-off system 46.

The cylindrical screen 80 and the bottom circular screen 82 are both constructed of fairly heavy gage wire screen, for example, of stainless steel to avoid corrosion problems. The screen support 83 positions the cylindrical screen 80 upright in the shell cylindrical portion 62 in a coaxial arrangement. Thus, the cylindrical screen 83 shares the longitudinal axis 79 with the shell portion 38. The screen support 83 also secures the bottom circular screen 82 to a lower axial end of the cylindrical screen 80. When assembled, the diameter dimension of both screens is approximately equal to accommodate1.

In operation, the gas enters the lint collector 30 through inlet 36, and flows into an annular space 84 between the outer shell 38 and the cylindrical screen 80 (See FIGS. 2 and 3). The thickness of the annular space 84 is equal to half the difference between accommodate2 and accommodate1, thus in the preferred embodiment, about five inches. At first the exhaust gas will flow through the closest section of the cylindrical screen 80, depositing lint on the outside, while the exhaust air penetrates the screen and exits the outer shell 38 through outlet 42. The lint deposit on this closest section thereby creates a resistance encouraging the gas to flow around the screen 80 to the closest clear area which may be either on the cylindrical screen 80 or the bottom circular screen 82. The "deposit lint/exit exhaust air" sequence continues until the dryer cycle is complete and all exhaust gas has exited the lint collector 30.

One may appreciate that the geometry of the screen assembly 40 creates a collecting surface which may be viewed as three dimensional, or non-planar, when compared to conventional, flat two-dimensional screens. This geometry permits the lint collector 30 to have a large collecting surface in a relatively small space. For example, in the illustrated embodiment, a flat screen of equal height having the same collecting surface as the cylindrical screen 80 would be more than three times as wide as the one shown. Thus the three dimensional collecting surface of the lint collector 30 allows a significant reduction in size, an especially practical advantage with so many industries confronting space limitations.

While the described screen assembly 40 includes a cylindrical screen 80 and a bottom screen 82, one may appreciate that other arrangements could be employed to accomplish the same advantages. For instance, the geometry of the cylindrical screen 80 could be altered to a polygonal, elliptical or other sectional shape and still create a three-dimensional collecting surface. For that matter, any collecting surface substantially surrounding or substantially circumscribing an axis will create a three dimensional collecting surface.

Additionally, although in the illustrated embodiment the gas travels radially inward while depositing lint on the outside of the screens, alternate gas paths may be used. For example, with appropriate modifications, the gas could enter from the inside of the screen and travel radially outward depositing the lint on the inside surface of the screen. Still further, the exhaust air could exit the screen assembly at the bottom axial end, instead of the top, and/or one of these ends could be solid instead of a screen.

The particular illustrated orientation of the screens 80 and 82 with in the shell 38 also has advantages, especially regarding accumulated lint removal needs. Because the cylindrical screen 80 is positioned with its longitudinal axis 79 vertical, gravity will aid the lint blow-off system 46 in removing accumulated lint. After the lint is blown off the screen 80 by air blast, it will drop to the lint storage drum 52 below. The positioning of the bottom circular screen 82 provides similar advantages.

Figure 9:
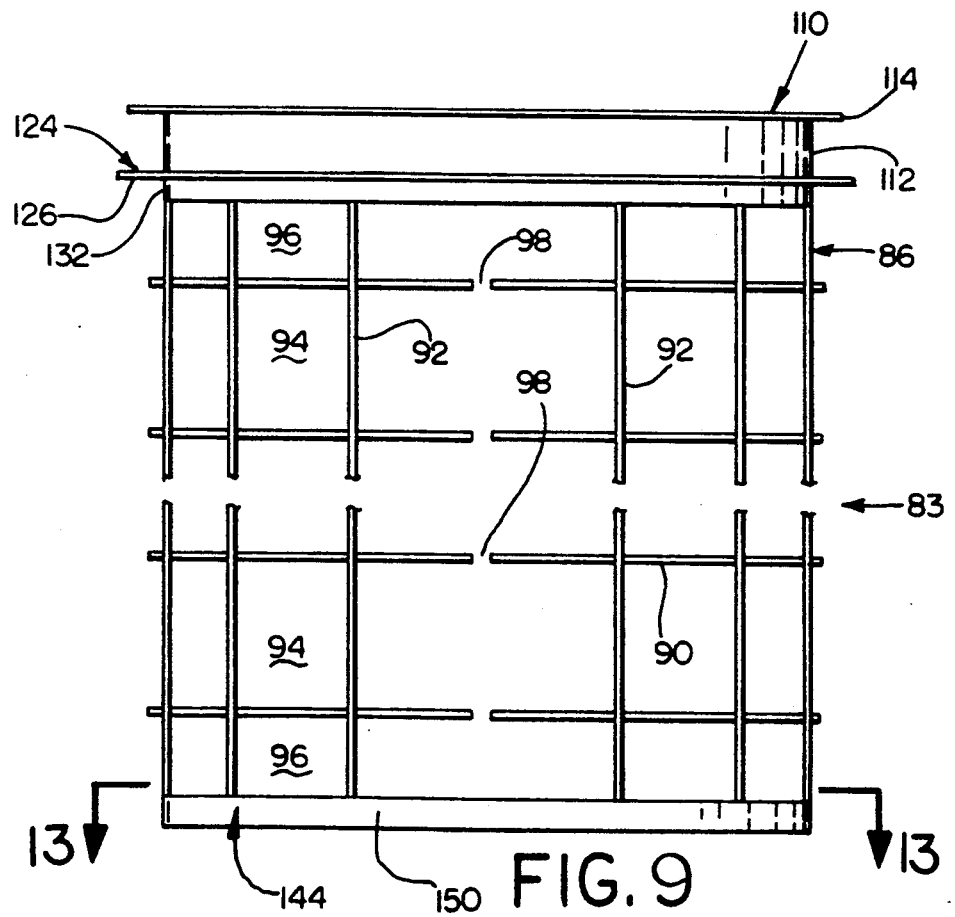
FIG. 9 is a front view of the screen support prior to the screens being mounted on it.
Figure 10:
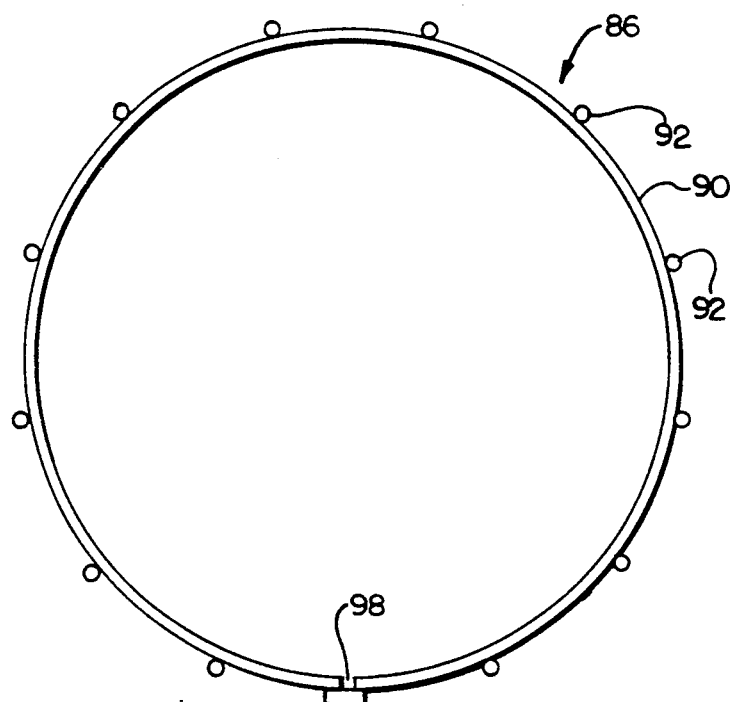
FIG. 10 is a top view of a cage, which is a structural member of the screen support, at an intermediate assembly stage.

While the screens 80 and 82 are the actual "lint collecting" elements of the screen assembly 40, the screen support 83 is the structural skeleton of the screen assembly. Referring additionally to FIGS. 9-16, details of the screen support 83 are shown. In FIG. 9, the screen support 83 is shown separately from the screens 80 and 82 and the other components of the lint collector 30. The screen support 83 includes a cylindrical cage 86 which is shown at intermediate assembly stages in FIG. 10. The cage 86 is formed by horizontal bars 90 intersecting with vertical bars 92. The bars 90 and 92 may be of cylindrical rod-like cross section, rectangular cross section or other configuration.

The bars 90 and 92 together form a plurality of inner cage openings 94 and top and bottom cage openings 96. The inner cage openings 94 are preferably polygonal, and more preferably square, and have a side dimension which is preferably between four and eight inches and more preferably approximately six inches. The top and both cage openings 96 are preferably of the same width as the inner openings 94, with a reduced height to accommodate the actual height of the screen assembly 40.

The reinforcing cage 86 begins as a flat section of steel mesh, which is rolled into a cylindrical shape. The horizontal bars 90 meet at a closing gap 98, approximately one quarter inch wide. A closing bar 100 is welded across the gap 98, securing the cage 86 in the desired cylindrical shape. (See FIG. 10)

When assembled, the cylindrical screen 80 surrounds the cage 86, the cage providing reinforcement for the screen. While tightly framed fabric screens are easily punctured if hit by a foreign object, the screen assembly 40 of the present invention is better able to withstand such abuse. For example, if a foreign object were to hit an area of screen 80, which is directly backed up by the cage 86, then it would not go through. Further, if a foreign object were to hit the screen 80 in an area overlying one of the cage openings, the cage 86 would help absorb the shock of the object hitting the screen.

While the cage 86 functions as a reinforcement for the cylindrical screen 80, it also importantly aids in the efficient removal of lint from the screen assembly 40. Without the cage 86, a cylindrical "blanket" or solid sheet of lint would probably develop on the screen. Such a development would force the lint blow-off system 46 to remove the entire blanket or at least large chunks of it. Once removed, the entire blanket would have to drop down into the conical portion 64 and finally into the lint storage drum 52. The larger the blanket of lint, the greater the chances of hang up during this drop and of blocking the inlet to the storage drum.

Instead of permitting one large lint "blanket" to form, in the present invention the cage 86 effectively subdivides the lint blanket into small sections by blocking gas flow through the screen 80 at areas overlying respective bars 90 and 92. This blocking causes the lint to accumulate on the screen 80 in a plurality of relatively small rectangular sections which are easily removed and easily dropped into the lint storage drum 52 below. Thus the cage openings 94 and 96 in the cage 86 should be dimensioned large enough to allow an adequate flow of gas through the screen assembly 40, yet small enough to provide adequate reinforcement and to subdivide the accumulation of lint into manageable sections.

Figure 11:
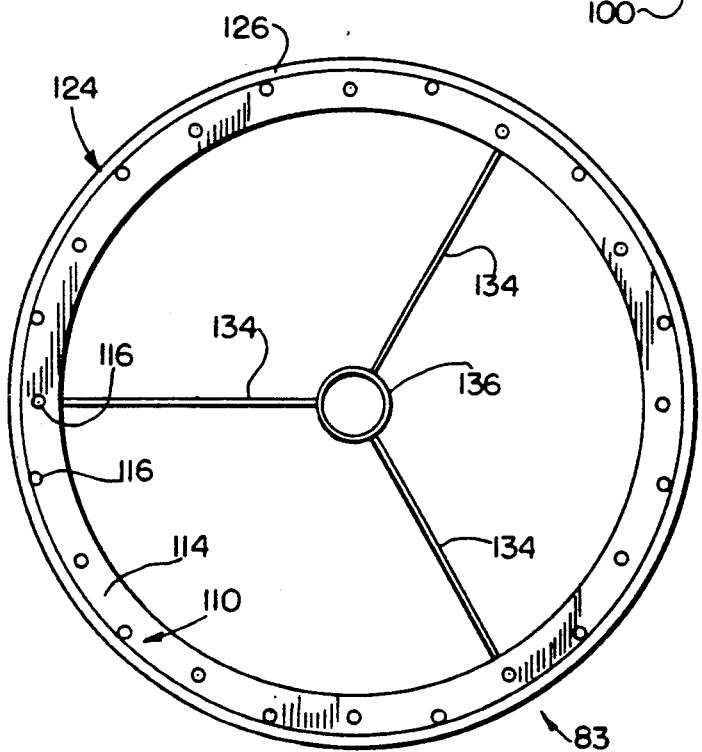
FIG. 11 is a top view of the screen support.
Figure 12:
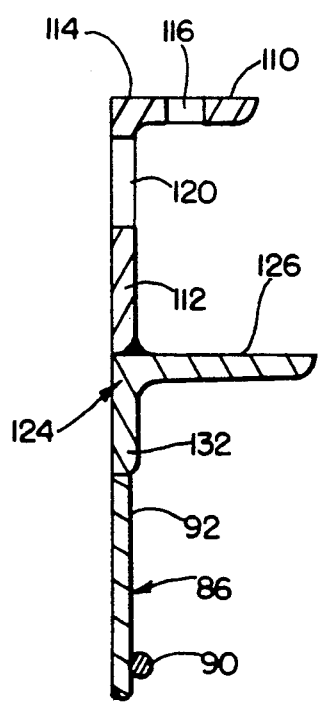
FIG. 12 is an enlarged sectional view of some top structural members of the screen support.

Referring additionally to FIGS. 11-14, some other structural members of the screen support 83 are shown. Particularly, the top structural members of the screen support 83 are shown in FIGS. 11 and 12. The screen support 83 includes a top weldment, or top ring 110, having an inner diameter approximately equal to accommodate1. The top ring 110 has a vertical flange 112 and a horizontal flange 114. The horizontal flange 114 extends radially outward and has holes 116 for bolting the screen assembly 40 to the exhaust duct 43. The vertical flange 112 extends downwardly and is solid except for a blow-off air inlet pipe opening 120 which coordinates with the lint blow-off system 46.

A top connecting ring 124 is provided shaped in section similar to the top ring 110 and having an inner diameter equal to the diameter of the opening surrounded by top flange 63. The ring 124 has an upper horizontal flange 126 extending radially outward, and a lower vertical side arm 132. The upper flange 126 is welded to the vertical flange 112 of the top ring 110. The lower side arm 132 is welded to the top edges of vertical cage bars 92. Three top bars 134 are connected to the top connecting ring 124 at one end and extend radially inward. The three top bars 134 are circumferentially spaced 120° apart. The bars are arranged so they do not interfere with clearance needed at the air inlet pipe opening (FIG. 12) to permit an air pipe (described below) to extend therethrough. At their inner ends, the top bars 134 hold a central hub 136, which is associated with the blow-off system 46.

Figure 13:
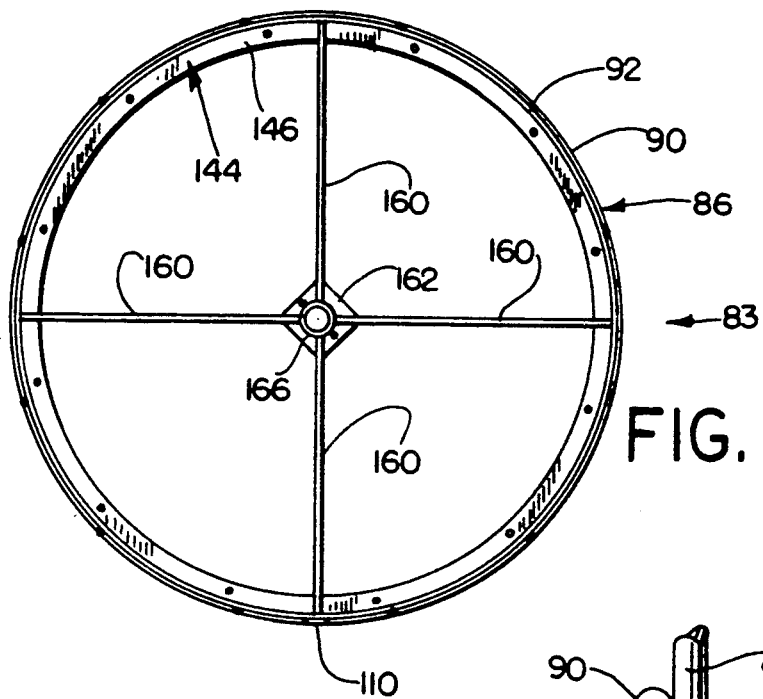
FIG. 13 is a plan view of the screen support looking in the direction of lines 13—13 in FIG. 9.
Figure 14:
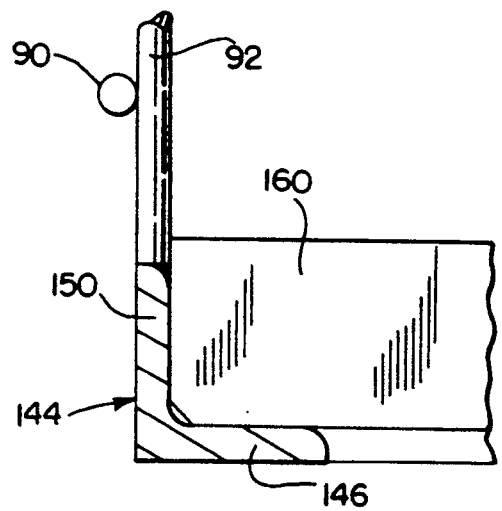
FIG. 14 is an enlarged sectional view of some bottom structural members of the screen support.

The bottom structural members of the screen support 83 are shown in FIGS. 13 and 14. The screen support 83 includes a bottom ring 144 having a horizontal annular flange 146 and a vertical annular flange 150. The top end of the vertical flange 150 is welded to the lower ends of vertical bars 92 of the cage 86. The horizontal flange 146 extends radially inward. Attached to the horizontal flange 146 are four bottom bars 160 which are circumferentially spaced 90° apart. The bottom bars 160 extend radially inward and each attach in the center to one corner of a square clamp plate 162. The clamp plate 162 has a bushing 166 attached to its top surface for coordination with the lint blow-off system 46.

Figure 15:
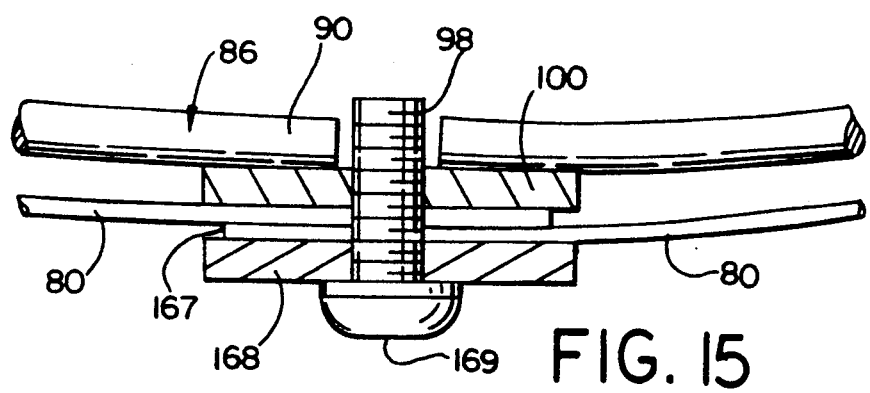
FIG. 15 is a top enlarged view of the cage showing a screen mounted on the cage.

The screens 80 and 82 are mounted on the screen support 83 in the following manner. The cylindrical screen 80, which is originally in flat form, is wrapped around the cage 86 beginning at the closing bar 100. As is shown in FIG. 15, the width of the screen 80 is such that its side edges will slightly overlap at a side seam 167 positioned at the closing bar 100. As is seen in FIG. 16, the length of the screen 80 is such that it will extend above the top of the cage 86 and over the lower side arm 132 of the top connecting ring 124; and also so that it will extend below the bottom of the cage and over the vertical flange 150 of the bottom ring 144.

Figure 17:
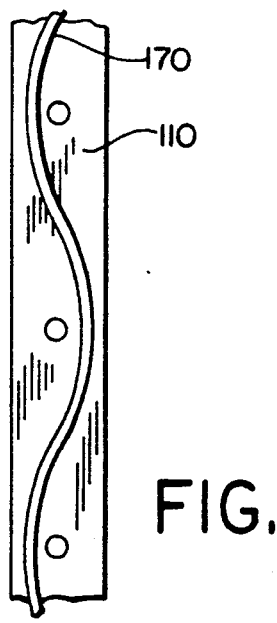
FIG. 17 is a sectional view of the cage and screen illustrating a sealing method therefor.

To close the side seam 167 of the cylindrical screen 80 and also to secure it to the screen support 83, a clamp bar 168 such as the one shown in FIG. 15, is provided. The clamp bar 168 is identical, or almost identical, to the closing bar 100, and is placed over the closing bar 100, with the screen side seam 167 sandwiched therebetween. Bolts 169 are inserted into aligning holes in the closing bar 100 and clamp bar 168, and when tightened extend through the closing gap 98. Appropriate sealing such as that shown in FIG. 17 is provided. In the illustrated sealing arrangement, a strand of plastic sealant 170 is woven among the bolts 169 prior to tightening. After the bolts 169 are tightened, the sealant 170 will prevent leakage of the exhaust gas through the screen side seam 167.

Figure 16:
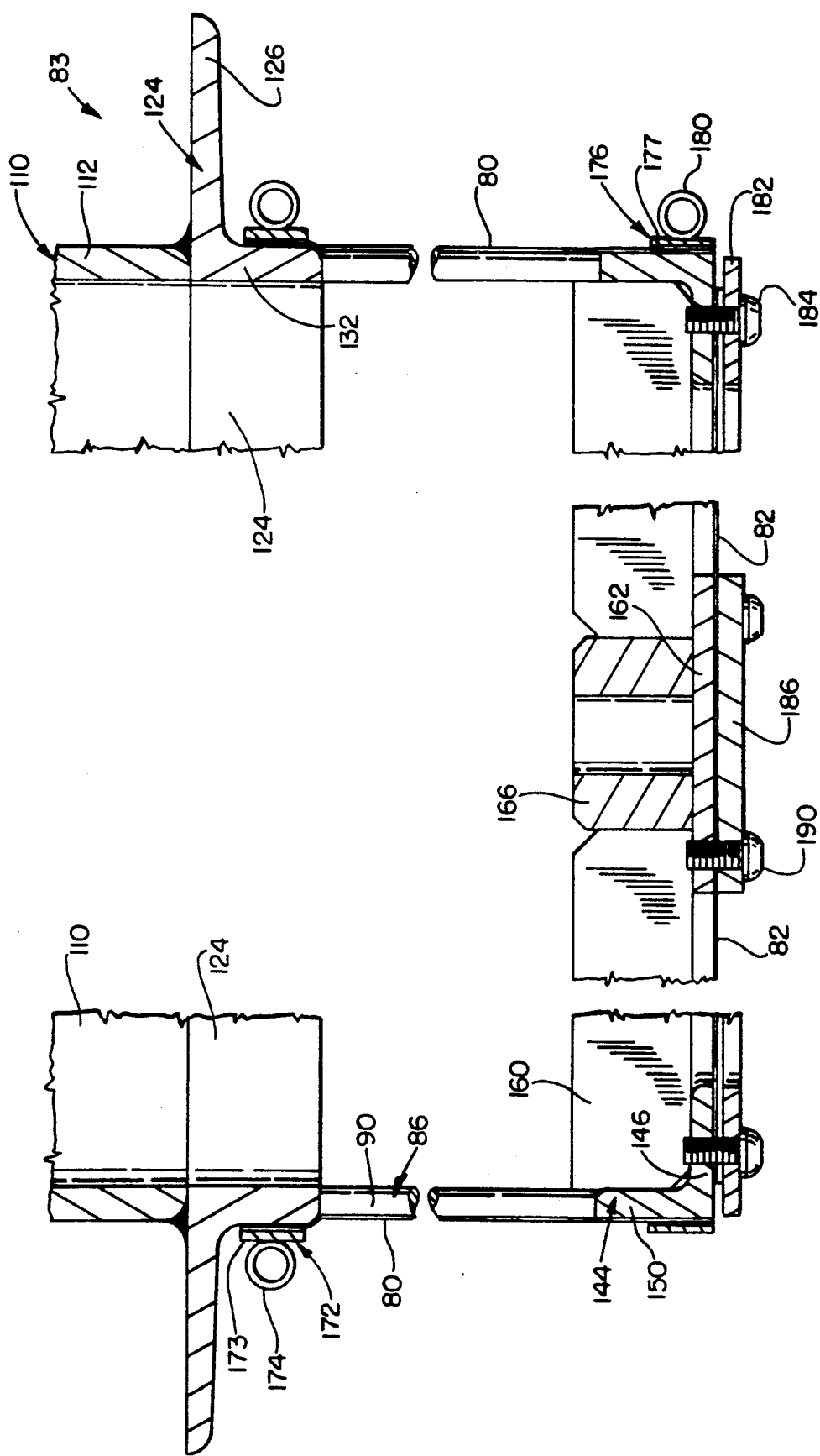
FIG. 16 is an enlarged section view of the screen support with screens mounted thereon.

Referring now to FIG. 16, other details of the mounting of screens 80 and 82 onto the screen support 83 are shown. The cylindrical screen 80 is secured to the top of the screen support 83 by way of an upper retaining ring 172. The ring 172 has a single vertical flange 173 which slips around the lower side arm 132 of the top connecting ring 124, and over the upper edges of the screen 80. An upper ring clamp 174 tightens the retaining ring 172 in place, the clamping ring preferably being aligned with the clamp bar 168.

The cylindrical screen 80 is secured to the bottom of the screen support 83 in a similar manner as it is secured to the top of the screen support. A lower retaining ring 176 is provided having a single vertical flange 177. The vertical flange 177 slips around the vertical flange 150 of the bottom ring 144, and over the lower edges of the screen. A lower ring clamp 180 preferably aligned with the clamp bar 168, tightens the lower retaining ring 176 in place.

To mount the bottom circular screen 82 on the screen support 83, the screen is positioned beneath the horizontal flange 146 of the bottom ring 144 and the clamping plate 162. A bottom retaining ring 182 is secured to the horizontal flange 146 of the bottom ring 144, the outer edge of the bottom screen 82 being sandwiched therebetween. Specifically, bolts 184 extend upwardly through aligning holes in the ring 182 and the flange 146. The holes are preferably positioned so as not to interfere with the four bottom bars 160. (See FIG. 13). Additionally, a second clamp plate 186 is secured to the clamp plate 162 with bolts 190 which extend through aligning holes. The central portion of the screen 82 is sandwiched between the clamp plates 162 and 186. These bottom connections may be sealed with a strand of plastic sealant as explained above in reference to the side seam 167 of the cylindrical screen 80.

Once assembled, the screens 80 and 82 and the screen support 83 form a roughly cylindrical shape, as shown in FIG. 7. The entire screen assembly 40 may be lowered into the outer shell 38 through the top opening 42. The horizontal stem 126 of the top connecting ring 124 is sized to cooperate with the upper flange 63 for attaching the screen assembly 40 to the outer shell 38. Appropriate sealing is provided to prevent leakage of the exhaust gas from the outer shell 38 to the surrounding environment. Note that if the exhaust duct 43 is independently supported, i.e., separately from the outer shell 38, as suggested above, the lint collector 30 may be detached from the connection duct 34 and exhaust duct 43. The lint collector 30 may then be moved to a convenient work location and the screen assembly 40 lifted out for maintenance, inspection or other purposes.

While the screen assembly 40 serves to collect lint when the dryer 32 is operating, the lint blow-off system 46 removes lint from the screen assembly 40 when the dryer is shut off. As explained above, the lint blow-off system 46 includes a spray manifold 48 positioned inside the screen assembly 40 (FIG. 21). The spray manifold 48 sprays a gas, usually compressed air, radially outward and axially downward, forcing lint off of the screens 80 and 82. The lint then falls down into the conical portion 64 of the shell 38 and then further into the lint storage drum 52.

The spray manifold 48 is best seen in FIGS. 18-20. The spray manifold 48, preferably made of brass pipe and fittings, includes an upper supporting portion 200 and a bottom supporting portion 202. These supporting portions rotate a spraying portion 204 around the interior of the screen assembly 40 while a plurality of air nozzles 206 spray air in the appropriate direction.

The upper supporting portion 200 includes a rotating union 208. The union 208 may be periodically lubricated through the access opening 44 in the exhaust duct 43 (See FIG. 1). A coupling 210 joins the rotating union 208 to the upper supporting portion 200. The upper supporting portion 200 includes a vertical portion 212, a 90° bend 214, and a horizontal portion 216. The bottom supporting portion 202 includes a pivot weldment 220 which is rotatably secured in the bushing 166 (FIG. 13).

The upper supporting portion 200 is connected to the spraying portion 204 by a tee 226. The tee 226 includes a drain cock 230 to allow a controlled amount of compressed air to escape thereby providing the means of propulsion and rotation of the spray manifold 48. The spraying portion 204 includes an upper vertical spraying pipe 232 and a lower vertical spraying pipe 234. The bottom end of the lower vertical spraying pipe 234 is bent at a first 90° bend 236 and then a second, opposite 90° bend 237.

The spraying pipes 232 and 234 include air nozzles 206 situated to spray air radially outward to remove lint from the cylindrical screen 80. Additionally, the connection piece 226 includes an air nozzle 206 situated to spray air in a common direction, i.e. radially outward. In this manner, the spraying portion 204 will develop a rotatable air curtain which is directed toward the accumulated lint on the cylindrical screen 80. Additionally, the air spray from the bends 236 and 237 will spray air in a downward direction to remove lint from the bottom screen 82.

The spray of air during the blow-off process is illustrated in FIG. 21. As is shown, the spraying portion 204 sprays air along the entire height of the cylindrical screen 80 and along a radial section of the bottom screen 82. As the spray manifold 48 is rotated 360°, the entire surface of the screen 80 and screen 82 will be sprayed with air forcing essentially all accumulated lint off of the screen assembly 40.

Importantly, due to the cage 86, the lint accumulates on the cylindrical screen 80 in segments or sections that are significantly smaller than the entire surface of the screen. Thus, quite advantageously, the air flow from the spray manifold 48 need only be strong enough to remove these relatively small sections of lint rather than a large blanket of lint. Additionally, the sections of lint may fall easily into the lint storage drum 52.

During the blow-off process, the spray manifold 48 must be supplied with a blow-off gas, preferably compressed air. Many locations in which industrial dryers are used have a plant supply of compressed air, usually at about 100 psig. While the spray manifold 48 may be directly connected to such a supply, the blow-off process may deplete the air pressure if the air supply is inadequate for this function.

To avoid such complications, the blow-off system 46 includes an air supply system 260 which is shown schematically in FIG. 22. The system 260 is fed by a plant compressed air supply line 262 containing air at 100 psig. A tap off line 264 from the plant supply line 262 feeds an air filter/regulator 266 set at 80 psig. The regulator exits to an outlet line 270 which contains a flow control orifice 272. The flow control orifice prevents too much air from the line 264 from flowing into the air reservoir 50. Upstream from the orifice 272, the regulator outlet line 270 is connected to both the air reservoir 50 and a spray manifold air inlet pipe 274. The spray manifold air inlet line 274 enters the screen assembly 40 through the air inlet pipe opening 120 in the top ring 110 and is connected to the rotating union 208. The spray manifold air inlet line 274 includes a valve 276 which is, for example, a half inch, normally closed solenoid valve.

The air reservoir 50 acts as an accumulator which stores air pressure over an extended period of time (1-2 minutes), allowing a small air supply line ($\frac{1}{4}''$) to be used. Flow into the reservoir is controlled by the special orifice 272 to prevent a low pressure surge in the supply line during the filling or charging of this reservoir. During blow-off, the orifice also protects the supply line from low pressure surge. Other lint collectors require up to 1" air supply lines which allow large pressure surges during blow-down through the whole plant air supply system.

While the lint blow-off system 46 is in an idle mode, air from the plant supply line 262 is flowing from line 264 via the regulator 266 and the orifice 272 and gradually builds up in the air reservoir 50. The air filter/regulator 266 regulates the air pressure to 80 psig and insures that the blow-off air is of a sufficient purity. When the blow-off system 46 is activated, the solenoid valve 276 opens allowing blow-off air to travel to the spray manifold 48. When the blow-off process is complete, the valve 276 is closed, allowing the air supply system 260 to replenish its air supply.

While the above-described components, namely the outer shell 38, the screen assembly 40, and the blow-off system 46, are designed to remove lint from the exhaust gas, the lint collector 30 also contains certain safety features. One such feature is the water sprinkling system 54 which is provided as a safeguard against a fire igniting in the lint collector 30. The sprinkling system 54 is shown schematically in FIG. 22. Most dryer locations will have an existing water line such as a line 281. The water sprinkling system 54 includes a tap-off line 282 which is supplied by the existing water line 281. The tap-off line 282 includes a valve 284 such as a normally closed solenoid valve. Upstream from the valve 284 the tap-off line 282 is connected to a water spray assembly 286. The valve 284 is activated, or opened, by a temperature responsive switch 288 (FIG. 24) set, for example, at 200° F. A manual bypass line 290 and a manual bypass valve 292 are provided as a means to bypass the solenoid valve 284 thereby allowing the sprinkling system 54 to be activated by hand if necessary.

Figure 23:
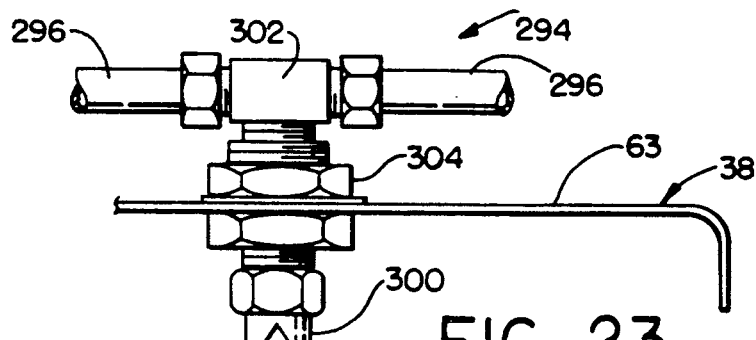
FIG. 23 is an enlarged view of a spray nozzle used in the sprinkling system.

The water spray assembly 286 includes a plurality of, and in the illustrated embodiment six, spray nozzle units 294 (FIG. 23) which are interconnected by copper tubing 296. An enlarged detailed view of one of the spray nozzle units 294 is shown in FIG. 23. Each spray nozzle unit 294 includes a spray nozzle head 300, a tee 302 and a straight elbow 304. The copper tubing 296 and a part of the spray nozzle units 294 are located above the outer shell 38 and the spray nozzle heads 300 are positioned in the interior of the lint collector 30. The spray nozzles heads 300 are positioned to spray water in the annular space 84 between the outer shell 38 and the screen assembly 40. Periodically, the lint storage drum 52 may be removed and the manual bypass valve 292 opened to flush water through the water spray assembly 286 and to keep the spray nozzle heads 300 free from undesired lint buildup.

Another safety feature is the overload indication system 55 which includes a pressure responsive switch 320 shown mounted on the outer shell 38 of the lint collector 30 in FIG. 3. The pressure responsive switch 320 is of a conventional pressure responsive switch design and is positioned to sense pressure in the shell 38 upstream from the screen assembly 40. If the volume of lint exceeds the capacity of the lint collector 30, the screen assembly 40 will become excessively clogged with, or blocked by, lint. The exhaust gas will not be able to penetrate the screen assembly 40 and a pressure build up will occur within the shell 38. When the pressure inside the lint collector 30 exceeds a predetermined limit, the pressure switch 320 activates an indicator lamp 322. The operator will then be alerted aware of the overload so he may stop the dryer 32 and blow-off the screen assembly 40 before the dryer is used further. In the preferred embodiment, the indicator lamp 322 will be activated when the pressure exceeds two inches water column.

Figure 24:
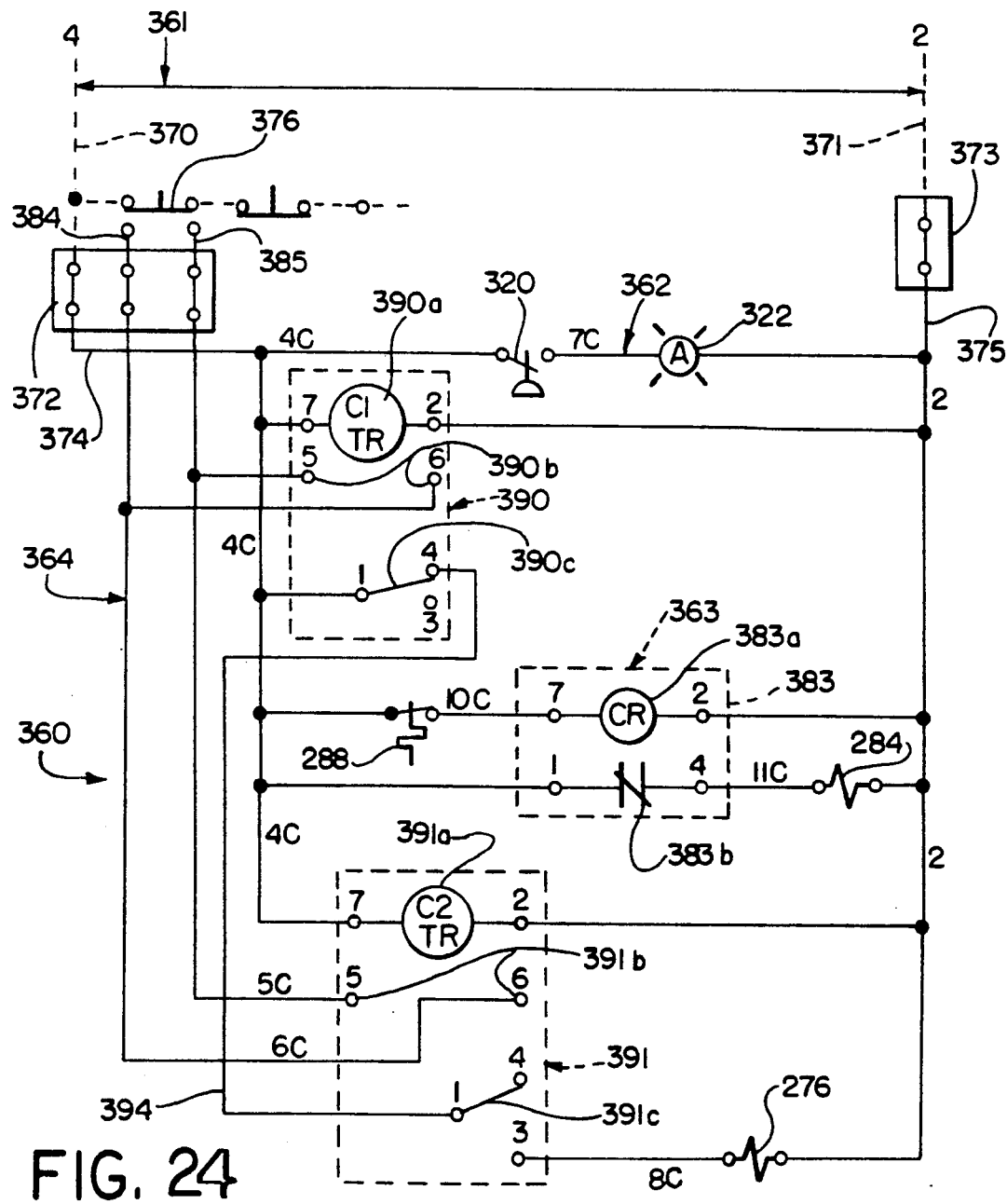
FIG. 24 is a schematic electric control circuit of the control system for the invention.

The lint blow-off system 46, the water sprinkler system 54, and the overload indication system 55 are activated and/or affected by the control system 56. An operative control circuit 360 for controlling operation of the lint collector in accordance with the present invention is illustrated in FIG. 24. The control circuit 360 and operation thereof are, of course, exemplary and other types of control circuits and/or control functions may be employed in accordance with the invention.

The control circuit 360 includes an input circuit 361, a overload indication circuit 362, a water sprinkler circuit 363 and a lint blow-off circuit 364. Briefly, the input circuit 361 receives electrical power. The overload indication circuit 362, together with the pressure responsive switch 320 and indicator lamp 322 are designed to detect a potentially hazardous overload condition and to alert an operator if such a condition occurs. The water sprinkler circuit 363 works in conjunction with the temperature responsive switch 288 and the normally closed solenoid valve 284 to detect the occurrence of an elevated temperature possibly representing a fire condition within the lint collector 30 and to supply water to the water spray assembly 286 if such a condition occurs. The lint blow-off circuit 364 activates the lint blow-off system 46 at the appropriate time relative to the dryer 32 being shut off.

More particularly, the input circuit 361 includes a pair of electrical lines 370 and 371 across which electrical power is supplied to the control circuit 360. Such electrical power may be, for example, 115 volt AC power from a utility company. The power is provided via a pair of terminal blocks 372 and 373 to lines 374 and 375 in the control circuit 360.

Dryers, such as dryer 32, will usually include an operation switch, such as a normally open dryer stop switch 376 shown in control circuit 360. The dryer stop switch 376 may be manually depressed by an operator to stop operation of the dryer when desired. A manual stop switch is usually preferred because it allows an operator selectively to stop the dryer when he is ready to unload it so that articles being dried do not wrinkle. However, the control circuit 360 would be equally compatible with an automatic dryer stop arrangement with appropriate modifications. Also, parallel connected stop switches may be used so each can be positioned at a respective convenient location. For example, one stop switch 376 may be located near the front of the dryer, and, another at the rear of the dryer for the convenience of the operator. Closing of the dryer stop switch 376 initiates the operation of the lint blow-off system as will be explained in more detail below.

The overload indication circuit 362 operates independently of the dryer stop switch 376. As explained above, the overload indication system indicates if the lint collector 30 becomes overloaded. In the event that the screen assembly 40 becomes excessively clogged with or blocked by lint, the pressure within the shell will exceed a predetermined value, such as two inches water column. The excessive pressure will cause the pressure responsive switch 320, which is normally open, to close. As is seen in FIG. 24, closure of the switch 320 will cause the indicator lamp 322 to become illuminated to indicate to an operator that the lint collector 30 may be overloaded. If desired, additional control apparatus may be coupled to and/or in place of the indicator lamp 322 to effect a desired control of the dryer 32 and/or lint collector 30 in response to such excessive pressure occurrence within the shell 38.

The water sprinkler circuit 363 also acts independently of the dryer stop switch 376. The circuit 363 includes a relay control 383 having a relay 383a and a normally closed contact 383b. These components work in conjunction with the temperature responsive switch 288 and the solenoid valve 284 (coupled to the water supply line) to supply water to the water spray assembly 286. The relay control 383, which is operative in response to whether or not the temperature responsive switch 288 is open or closed, controls energization of the solenoid valve 284. More specifically, the temperature responsive switch 288 is normally closed to energize the relay 383a, which in turn opens the normally closed contacts 383b. With the contacts 383b open, the normally closed solenoid valve 284 is not energized and remains closed. Thus water will not be supplied to the water spray assembly 286. However, in the event the temperature responsive switch 288 senses a temperature exceeding a predetermined limit, for example 200° F., the switch 288 will automatically open, terminating the energization of relay 383a. The normally closed contacts 383b will then close, thereby energizing, and opening, the normally closed solenoid valve 284. Water will then be supplied to the water spray assembly 286 to prevent or extinguish a fire in the lint collector 30.

The lint blow-off circuit 364, together with the solenoid valve 276 (coupled to the air supply line) supplies blow-off air to the spray manifold 48 at the appropriate time. Unlike the overload indication circuit 362 and the water sprinkler circuit 363, the operation of the lint blow-off circuit 364 is initiated by the closing of the dryer stop switch 376 which effects completion of a circuit across lines 384 and 385. A timing cycle is then initiated during part of which the solenoid valve 276 is energized to supply air to the spray manifold 48. A delay is provided during such timing cycle before which the air is supplied to the spray manifold until the effects of "coasting" (the tendency of a large exhaust blower (not shown) to continue to run even after a dryer is shut off) to dissipate or to be minimized so as not significantly to interfere with the blow-off process. The coasting exhaust blower creates a flow generally in the opposite direction of the blow-off flow derived from the spray manifold 48. If the lint blow-off system 46 was activated immediately, the two flows would be fighting against each other and a wave effect would result. In any event, the efficiency and effectiveness of the lint blow-off system 46 would be reduced.

Accordingly, the lint blow-off circuit 364 includes a pair of conventional timers 390 and 391 which may be mechanical or electronic timers. The first timer 390 includes a timing device 390a, which is coupled across lines 374 and 375 for energization; a pair of input contacts or terminal 390b, which are coupled to the two lines 384 and 385 to sense closure of the dryer stop switch 376; and an operative switch 390c, which responds to the timing device 390a. Upon closure of the dryer stop switch 376, a timed cycle of operation of the timing device 390a occurs, whereupon the normally closed switch 390c is opened by the timing device 390a. The duration that the switch 390c is opened is a function of a time period, T1, set on the timing device 390a. After that time expires, the switch 390c will be closed by the timing device 390a.

The second timer 391 is similar to the first timer 390. The second timer 391 includes a timing device 391a set on a time period T2 greater than T1, a pair of input contacts or terminals 391b, and an operative switch 391c. Upon closure of the stop switch 376, which is in a sense detected by the input contacts 391b, the timing device 391a is operative to close the normally open switch 391c for a time period equal to T2. After that time period expires, the switch 391c is opened.

Operation of the lint blow-off circuit 364 is initiated upon closure of the stop switch 376 to complete circuit across lines 384 and 385 which is detected by the respective timers 390 and 391. The timers both initiate their timing cycles, respectively, at time periods T1 and T2. For a time period equal to T1, the switch 390c is opened, while the switch 391c is closed. After the timing device 390a has timed out, e.g. time T1 has expired, the switch 390c is closed, while the switch 391c remains closed. The solenoid valve 276 is energized to receive electrical power from lines 374 and 375 via the closed switch 390c, an electrical line 394, and still closed switch 391c. During energization of the normally closed solenoid valve 276, it opens, and blow-off air may be supplied to the spray manifold 48. When the time period T2 set in the timer 391 expires, the switch 391c opens, whereupon the normally closed solenoid valve 276 returns to a closed condition, thereby closing (blocking) the flow path between the air reservoir 50 and the spray manifold 48.

The time periods T1 and T2 set in the timing devices 390a and 391a may be selected for the particular operation of the blow-off timing control circuit 364 that is desired for a particular lint collector. Specifically, the timing device 390a should be set at a time period T1 which allows the effects of coasting to minimize. This period is usually between 5 and 15 seconds with large dryers. Once the timing device 390a time period, T1, expires, air is supplied to the spray manifold 48. The actual "blow-off" time (the time period that blow-off air is actually blown on the screen assembly 40 for lint removal purposes) is the difference between T2 and T1, so T2 should be set at a value allowing adequate blow-off time. This period is usually between 2 and 4 seconds with large dryers. The timing devices 390a and 391a are preferably adjustable so that they may be set at different intervals depending on dryer coasting habits, and lint removal needs. In the preferred embodiment, the timing device 390a is set at 12.8 seconds, and the timing device 391a is set at 15 seconds, resulting in a blow-off time of 2.2 seconds.

In view of the foregoing, one may appreciate that the lint collector 30 provides many advantages over conventional lint collectors. The smooth interior surface of the outer shell 38 allows lint to fall smoothly down into the lint storage drum 52. The three dimensional collecting surface of the screen assembly 40 results in a significant reduction in size, and its vertical orientation aids in the lint removal process. The cage 86 provides structural benefits as well as breaking the lint up into small manageable sections. The blow-off system 46 does not deplete plant air supply and additionally converts the plant air into the desired pressure and purity. The control system 56 automatically activates the blow-off system 46 while compensating for the effects of coasting. These and other advantages are gained by a lint collector according to the present invention.

Although the invention has been shown and described with respect to a preferred embodiment, it is obvious that equivalent alternatives and modifications will occur to others skilled in the art upon the reading and understanding of this specification. The present invention includes all such equivalent alterations and modifications and is limited only by the scope of the following claims.

What is claimed is:

1. An apparatus for collecting lint from a gas, comprising a substantially gas impervious shell, a gas passageway through said shell, and a lint-collecting component having a longitudinal axis and including a lint-collecting surface substantially surrounding said longitudinal axis, said lint-collecting surface including a substantially cylindrical screen, said longitudinal axis being positioned in a relatively vertical direction, said shell including a shell cylindrical portion and said cylindrical screen being positioned in a coaxial arrangement with said shell cylindrical portion, said lint collecting surface including a substantially planar circular screen substantially completely covering an axial end of said cylindrical screen, said axial end being a bottom axial end of said cylindrical screen.

2. An apparatus as set forth in claim 1 wherein at least one of said screens is made of a material including stainless steel.

3. An apparatus as set forth in claim 1 wherein said gas passageway includes an inlet and an outlet, said inlet and said outlet being positioned whereby such gas must travel radially inward to reach said outlet.

4. An apparatus as set forth in claim 3 wherein a diameter dimension of said cylindrical screen is approximately equal to twenty-four inches and a diameter dimension of said shell cylindrical portion approximately equal to twenty-four inches, whereby an annular space of five inch thickness is defined between said cylindrical screen and said shell cylindrical portion.

5. An apparatus for collecting lint from a gas, comprising a shell, a gas passageway through said shell, a lint-collecting component having a longitudinal axis and including a lint-collecting surface substantially surrounding said longitudinal axis, cage means for causing such lint to accumulate in a plurality of sections, and a blow-off system, said blood-off system including an air reservoir, a connection line connecting said air reservoir to an air line, air regulating means for filling said air reservoir with air from such air line at a controlled rate, orifice means in said connection line for preventing a low pressure surge in said air line during such filling of said air reservoir with air, air spray means within said lint-collecting component, and an air inlet line connecting said air reservoir to said air spray means, said air spray means being movable relative to said lint-collecting surface for directing air from said reservoir through said lint-collecting surface to progressively remove the lint in sections from said lint-collecting surface.

6. An apparatus as set forth in claim 5, wherein said shell has a smooth interior surface to allow such lint to travel over said surface without hang-up.

7. An apparatus as set forth in claim 6, further comprising a lint collecting drum positioned at an axial end of said shell.

8. An apparatus for collecting lint from a gas, comprising a shell, a gas passageway through such shell, a lint-collecting component positioned to collect lint from such gas, said component including a lint collecting surface, cage means for causing such lint to accumulate in a plurality of sections on said lint-collecting surface, said gas passageway including an inlet and an outlet, said cage means being positioned between said collecting surface and said outlet, said cage means including interlocking bars forming a plurality of cage openings, and air spray means movable relative to said lint-collecting surface for directing compressed air through said lint-collecting surface to progressively remove the lint in sections substantially corresponding in size to said cage openings from said lint-collecting surface.

9. An apparatus as set forth in claim 8 wherein at least some of said cage openings are polygonal.

10. An apparatus as set forth in claim 9 wherein at least some of said cage openings are square.

11. An apparatus ass et forth in claim 10 wherein said cage openings have a side dimension between two and twelve inches.

12. An apparatus as set forth in claim 11 wherein said cage openings have a side dimension approximately equal to six inches.

13. An apparatus as set forth in claim 11 wherein said cage means is made from steel mesh.

14. An apparatus for collecting lint from a gas comprising a substantially gas impervious shell, a gas passageway through such shell, and a lint-collecting component positioned to collect lint from such gas, said lint-collecting component having a longitudinal axis and including a first lint-collecting screen substantially surrounding said longitudinal axis, said longitudinal axis being positioned in a relatively vertical direction, and a second substantially planar lint-collecting screen substantially completely covering a bottom axial end of said first screen.

15. An apparatus as set forth in claim 14, wherein said shell has a smooth interior surface to allow such lint to travel over said surface without hang-ups, said shell including an upper cylindrical portion and a lower conical portion, said conical portion including a top edge bent to engage an exterior surface of said cylindrical portion, said top edge of said conical portion being welded to said exterior surface of said cylindrical portion.

16. An apparatus as set forth in claim 15 wherein said cylindrical portion includes a bottom edge that is smoothed off so as to be flush with an interior surface of said conical portion.

17. An apparatus as set forth in claim 16, further comprising cage means for causing such lint to accumulate in a plurality of sections.

18. An apparatus as set forth in claim 17 further comprising a blow-off system; said blow-off system including:
- an air reservoir;
- a connection line connecting said air reservoir to an air line;
- air regulating means for filling said air reservoir with air from such air line at a controlled rate, and means for directing such air from said reservoir through said lint-collecting component to remove lint from said lint-collecting component, said longitudinal axis being positioned in a relatively vertical direction.

19. An apparatus as set forth in claim 4, further comprising cage means for causing such lint to accumulate in a plurality of sections.

20. An apparatus as set forth in claim 19 further comprising a blow-off system; said blow-off system including;
- an air reservoir;
- a connection line connecting said air reservoir to an air line; and
- air regulating means for filling said air reservoir with air from such air line at a controlled rate.

21. An apparatus as set forth in claim 20, wherein said shell has a smooth interior surface to allow such lint to travel over said surface without hang-up.

22. An apparatus as set forth in claim 16 further comprising a blow-off system for blowing lint off said second lint-collecting screens, said blow-off system including an air reservoir, a connection line connecting said air reservoir to an air line, air regulating means for filling said air reservoir with air from such air line at a controlled rate, and air spray means movable relative to said first and second screens to direct air received from said reservoir radially outward and axially downward to remove lint from said first and second screens.

23. An apparatus as set forth in claim 16, where said shell has a smooth interior surface to allow such lint to travel over said surface without hang-up.

24. An apparatus as set forth in claim 23 wherein said shell includes an upper cylindrical portion and a lower conical portion, said conical portion including a top edge bent to engage an exterior surface of said cylindrical portion, said top edge of said conical portion being welded to said exterior surface of said cylindrical portion.

25. An apparatus as set forth in claim 16 further comprising cage means for causing such lint to accumulate in a plurality of sections on said lint-collecting component, said cage means including interlocking bars forming a plurality of cage openings.

26. An apparatus for collecting lint from a gas comprising a shell, a gas passageway through such shell, a lint-collecting component positioned to collect lint from such gas, said component including a lint-collecting surface, cage means for causing such lint to accumulate in a plurality of sections on said lint-collecting surface, said cage means including interlocking bars forming a plurality of cage openings, and air spray means movable relative to said lint-collecting surface for directing compressed air through said lint-collecting surface to progressively remove the lint in sections substantially corresponding in size to said cage openings from said lint-collecting surface.

27. An apparatus as set forth in claim 26, wherein said gas passageway includes an inlet and an outlet, said cage means being positioned between said lint-collecting surface and said outlet.

28. An apparatus as set forth in claim 26, wherein said lint-collecting component has a longitudinal axis and at least a portion of said lint-collecting surface substantially surrounds said longitudinal axis.

29. An apparatus as set forth in claim 28, wherein said cage means includes a cylindrical portion surrounded by a cylindrical portion of said lint-collecting surface.

30. An apparatus for collecting lint from a gas comprising a substantially gas impervious shell, a gas passageway through said shell, a lint-collecting component positioned to collecting from said gas, said component including a lint-collecting surface, and blow-off means for blowing lint off said lint-collecting surface, said blow-off means comprising an air reservoir, a connection line connecting said air reservoir to an air line, air regulating means for filling said air reservoir with air from such air line at a controlled rate, orifice means in said connection line for preventing a low pressure surge in said air line during such filling of said air reservoir with air, and means for directing such air from said reservoir through said lint-collecting surface to remove lint from said lint-collecting surface.

31. An apparatus as set forth in claim 30, wherein said shell has a smooth interior surface to allow such lint to travel over said interior surface without hang-up.

32. An apparatus as set forth in claim 31 wherein said longitudinal axis is positioned in a relatively vertical direction.

33. An apparatus as set forth in claim 5, wherein said inlet line includes a normally closed solenoid valve, and control means are provided for activating said solenoid valve to supply air from said air reservoir to said air spray means.

34. An apparatus for collecting lint from a gas, comprising a shell, a gas passageway through said shell, a lint-collecting component having a longitudinal axis and including a lint-collecting surface substantially surrounding said longitudinal axis, cage means for causing such lint to accumulate in a plurality of sections, sand a blow-off system, said blow-off system including an air reservoir, a connection line connecting said air reservoir to an air line, air regulating means for filling said air reservoir with air from such air line at a controlled rate, air spray means within said lint-collecting component, and an air inlet line connecting said air reservoir to said air spray means, said air spray means being movable relative to said lint-collecting surface for directing air from said reservoir through said lint-collecting surface to progressively remove the lint in sections from said lint-collecting surface, said inlet line including a normally closed solenoid valve, and control means are provided for activating said solenoid valve to supply air from said air reservoir to said air spray means, said control means including delay means for delaying opening of said solenoid valve for a set period of time, said delay means including an adjustable timer.

35. An apparatus as set forth in claim 34, wherein said control means includes a second timer for closing said solenoid valve after said solenoid valve has been opened by said adjustable timer for a set period of time.

36. An apparatus for collecting lint from a gas, comprising a shell, a gas passageway through said shell, a lint-collecting component having a longitudinal axis and including a first lint-collecting screen substantially surrounding said longitudinal axis, said longitudinal axis being positioned in a relatively vertical direction, and a second lint-collecting screen overlying a bottom axial end of said first screen, cage means for causing such lint to accumulate in a plurality of sections, and a blow-off system, said blow-off system including an air reservoir, a connection line connecting said air reservoir to an air line, air regulating means or filling said air reservoir with air from such air line at a controlled rate, air spray means within said lint-collecting component, and an air inlet line connecting said air reservoir to said air spray means, said air spray means being movable relative to said lint-collecting surface for directing air from said reservoir through said lint-collecting surface to progressively remove the lint in sections from said lint-collecting surface, said air spray means including vertical and horizontal spray pipe means containing a plurality of air nozzles for directing such air received from said reservoir radially outward and axially downward to blow lint off said first and second screens.

37. An apparatus as set forth in claim 36, further comprising means for allowing a controlled amount of such air received from said reservoir to escape from said air spray means in a direction causing said air spray means to move relative to said lint-collecting component.

38. An apparatus as set forth in claim 22, wherein said air spray means includes vertical and horizontal spray pipe means containing a plurality of air nozzles for directing such air received from said reservoir radially outward and axially downward to below lint off said first and second screens.

39. An apparatus as set forth in claim 21, further comprising a lint collector drum positioned at an axial end of said shell.

* * * * *